Aug. 5, 1958  L. "TED" MacLAUGHLIN  2,846,189
LAWN HOSE GUIDE
Filed Jan. 23, 1956
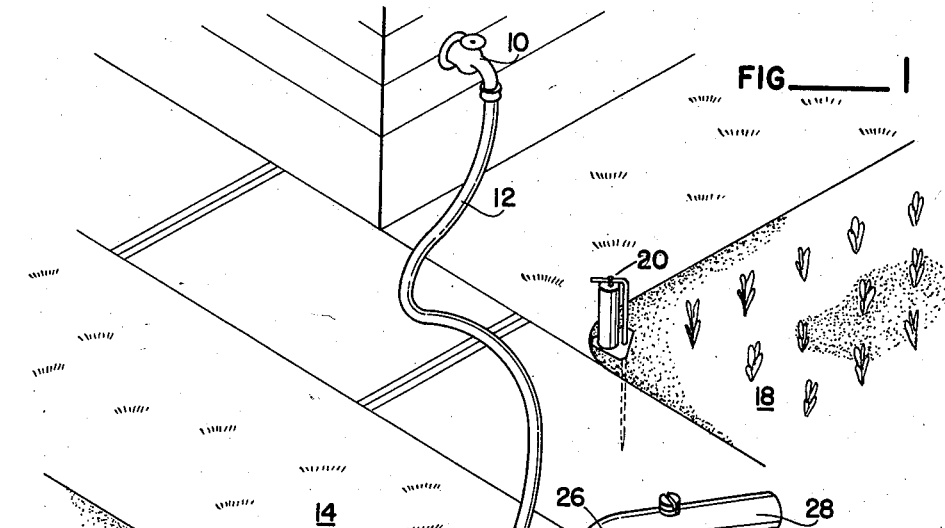
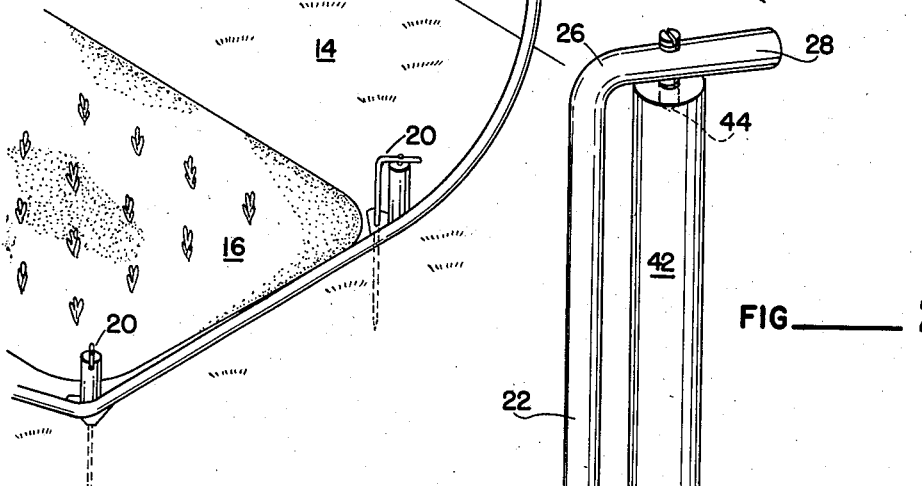
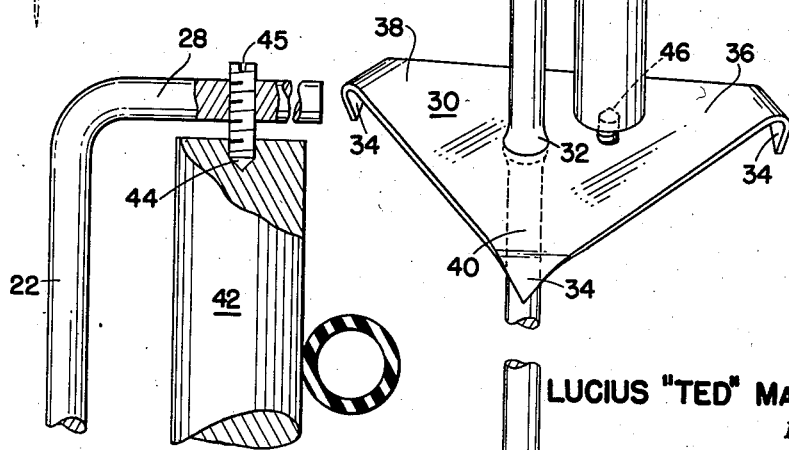
LUCIUS "TED" MacLAUGHLIN
INVENTOR.
BY Smith & Tuck

United States Patent Office 2,846,189
Patented Aug. 5, 1958

2,846,189

LAWN HOSE GUIDE

Lucius "Ted" MacLaughlin, Seattle, Wash.

Application January 23, 1956, Serial No. 560,518

4 Claims. (Cl. 254—190)

My invention relates to a garden appliance and more particularly to a lawn hose guide useful for restraining bights of garden hoses from being drawn into a flowerbed or elsewhere when a pull is applied to an end of the hose.

It is among the more important objects of my invention to provide a hose guide which is capable of directing a hose around a relatively sharp corner without collapsing it; to so direct a hose without increasing friction or drag on the hose; to provide means in such a device to resist substantial pulls applied to the hose without overturning of the guide; to devise such a guide which is capable of allowing the free running and turning of a hose around its axis while precluding upward creeping and dislodgment of a hose from the guiding member. A primary objective is to provide such a guide of durable construction and yet of such economical construction as to sell for a price acceptable to the general purchasing public.

These and other objects of this invention that will be more apparent in the course of the following specification are accomplished by the structure described in this specification and shown in the accompanying drawings in which:

Figure 1 is a perspective view schematically suggesting a garden and showing the use of the hose guide at the margin of flowerbeds;

Figure 2 is an enlarged, fragmentary perspective view of the hose guide; and

Figure 3 is a fragmentary view in elevation of the upper portion of the hose guide, with portions broken away for convenience of illustration.

Referring to Figure 1 of the drawings, there is shown a water faucet 10 to which is attached the hose 12 that is to be used in watering a lawn as 14 while at the same time it is desirable to avoid dragging the hose through flower-beds 16 and 18. My hose guides are indicated generally by the numeral 20 and it will be apparent that they have been placed at strategic corners in the yard and garden so that, when bights in the hose are drawn around the ends of such beds, the hose guides will prevent the hose from taking the shortest distance from faucet 10 to the sprinkler on the hose outer end and be dragged through the flower-beds 16 and 18.

In Figure 2 I have shown the essential components of my hose guide. They include the upright rod 22 which is of substantial length and has a lower pointed end 24 to permit its easy introduction into the ground. The upper end of the rod is right angularly bent at 26 to provide the offset right angularly disposed arm 28. Intermediate the ends of rod 22 is located a stop member or stabilizing member 30 which is secured in place on the rod through the same having been swaged at 32 to form shoulders above and below the plate-like material from which the stop member 30 is formed.

In the preferred embodiment of my invention the stop member 30 is triangular in shape and each of its corners is bent downward to provide claws or barbs 34 that penetrate the ground and resist dislodgment of the hose guide. As shown in Figure 2, the stop member 30 has one angle 36 of its triangular shape directed outward from the rod in underlying and aligned relationship to the arm 28. The other portions 38 and 40 of stop member 30 are disposed to the opposite side of rod 22 slightly rearward and laterally where they serve to stabilize the plate and resist overturning moments of force.

A roller 42 is mounted between arm 28 and plate portion 36 on trunnions 44, 46. These trunnion members 44, 46 preferably comprise sharp-pointed pins disposed in openings in the roller adapted to permit free rotation to the roller 42 relative the trunnions. Pin 44 assumes the shape of a set screw and is threadedly engaged in an opening through arm 28. By means of screw slot 45, the pin may be vertically adjusted with relation to pin 46 and thus a degree of tension on the roller 42 there between can be adjusted. Pin 46 is similar to pin 44 and is threadedly engaged in an opening in plate 30. Normally roller 42 is formed of wood or similar material and this pin mounting arrangement also permits replacement of the roller as occasion may require.

The offset bent arm 28 serves as a handle for the easy introduction of the pin 22 into the ground and, as a dual function, serves as the support for the upper trunnion member of roller 42.

From the foregoing description it will be seen that my invention provides a very simply constructed roller guide for a garden hose and the like which will effectively and efficiently guide the hose around various obstacles or objects. The hose is protected from abrasive, scraping or cutting action found with ordinary stakes. The guide prevents scraping out and short-cutting across flower-beds, strawberry-beds or the like and damaging them. The structure highly durable and is surprisingly economical to produce for a device of this type.

The disclosure made herein of course is exemplary and it will occur to those skilled in the art that changes and alterations may be incorporated in the structure. Such changes and alterations as are within the spirit and scope of the sub-joined claims I consider a part of this invention.

Having thus described my invention, I claim:

1. A lawn hose guide, comprising: an elongated, ground-penetrating rod adapted to be pressed into the ground a substantial distance, said rod having on its upper end a right angular bent portion; a stop member encircling said rod intermediate its ends to stabilize the rod in the ground and comprising a plate of substantial breadth having a portion underlying said right angular part of said rod; axially aligned trunnion means carried by said stop member and said bent portion of the rod and a roller parallel to and spaced from the longitudinal axis of said rod pivotally mounted on said trunnion means with its axis in alignment with the axis of said trunnion members whereby said roller may freely rotate.

2. The subject matter of claim 1 in which a stop member is triangular shaped and the corners thereof are bent downward to provide ground penetrating claws on the underside of the stop member.

3. The structure according to claim 1 in which the stop member is triangular and an angle thereof underlies the bent portion of the rod, and the remaining two angles thereof are laterally spaced to the sides and to the rear of said rod oppositely from the bent portion.

4. The subject matter of claim 3 in which there is a downwardly extending claw at each apex of the triangular stop member.

References Cited in the file of this patent

UNITED STATES PATENTS

| 1,831,306 | Kakimoto | Nov. 10, 1931 |
| 1,968,357 | Schmiett | July 31, 1934 |
| 2,501,407 | Olsen et al. | Mar. 21, 1950 |
| 2,657,012 | Whitlock | Oct. 27, 1953 |